United States Patent [19]

Forker, Jr. et al.

[11] 3,932,681

[45] Jan. 13, 1976

[54] CERAMIC MASKING METHOD

[75] Inventors: Ray B. Forker, Jr., Horseheads; Joseph N. Panzarino, Big Flats, both of N.Y.

[73] Assignee: Corning Glass Works, Corning, N.Y.

[22] Filed: Mar. 11, 1974

[21] Appl. No.: 449,897

[52] U.S. Cl. .................. 427/282; 106/2; 427/287; 427/314; 106/69; 106/71; 106/73.3
[51] Int. Cl.$^2$ ...................... B44D 1/52; B44D 3/20
[58] Field of Search ............ 117/5.5, 38, 54, 123 A, 117/123 B, 125; 106/2, 69, 71, 73.3; 427/282, 287, 314

[56] References Cited
UNITED STATES PATENTS 3,560,236   2/1971   Orta...................................... 117/5.5

*Primary Examiner*—Michael R. Lusignan
*Attorney, Agent, or Firm*—Kees van der Sterre; Clinton S. Janes, Jr.; Clarence R. Patty, Jr.

[57] ABSTRACT

Heat-resistant masking compositions suitable for use in masking vitreous and semicrystalline ceramic surfaces from coating by liquid-sprayed coating compositions to provide permeation-resistant masks which are readily removable even after high temperature firing are described. The masking compositions comprise bentonite clay and a finely-divided refractory inorganic oxide release agent.

7 Claims, No Drawings

CERAMIC MASKING METHOD

BACKGROUND OF THE INVENTION

In the ceramic art it is often desirable to utilize spray-coating processes to provide decorative, protective, electrically-conductive, reflective or other similarly functional coatings on ceramic articles. A wide variety of solutions, emulsions and suspensions useful for providing such functional coatings are commonly applied to ceramic articles by spraying in liquid form.

In many cases, it is desirable to apply sprayed coating compositions only to selected portions of a ceramic article. The expedient of masking portions of the article which are not to receive the coating composition is then employed because of the difficulty of precisely controlling the spraying process to cover only limited surface areas.

The most important requirement of a good masking material is that it be sufficiently impervious to the sprayed coating composition to prevent contact between the composition and the ceramic surface. In addition, where it is desired that the mask undergo additional processing steps prior or subsequent to the actual spray coating operation, the mask must not interact deleteriously with the ceramic surface or the coating composition during these additional processing steps.

The most common example of additional processing which adversely affects common masking material is high temperature firing. Many ceramic coating operations involve firing at quite high temperatures prior or subsequent to the spray application of the coating composition, and few masking materials will survive such a firing without adversely affecting the coating or the ceramic substrate.

Bulky masking assemblages suitable for mechanical attachment to ceramic articles may be fabricated of refractory materials such as stainless steel or asbestos to provide masks which will withstand a high temperature firing treatment. However, the thickness required to impart reasonable mechanical durability to such an assemblage necessarily produces a thick mask which causes a shadowing or halo effect at the edge portions of a sprayed coating. Thus, thick masks are unacceptable where coating edge thickness is important.

Masking compositions which may be applied to ceramic surfaces to provide thin masking coatings thereon have been employed in the prior art, but many are excessively permeable and most will not withstand high temperature firing without themselves bonding to the ceramic substrate to an objectionable degree. Attempts to circumvent this problem by providing masking compositions composed of refractory materials resistant to bonding and sintering have not been successful because such compositions are commonly porous and thus permeable by sprayed coating compositions.

What is therefore required is a masking composition which is both impermeable to liquid coating compositions and readily removable from ceramic surfaces after exposure to elevated firing temperatures.

SUMMARY OF THE INVENTION

We have now discovered masking compositions which will provide a mask which is both impermeable to most sprayed coating compositions and readily removable from non-porous ceramic surfaces even after firing to temperatures as high as 700°C. or higher. Our masking compositions comprise a bentonite clay component, typically making up about 40–90% by weight of the composition, and a finely-divided refractory metal oxide release agent component, typically making up about 10–60% by weight of the composition, which is essential to the removability of the composition after exposure to elevated temperatures in excess of about 500°C.

The nature and precise composition of the bentonite clay component of the mask is not critical to the invention; any of the commercially available bentonite clays are suitable constituents of our masking compositions. However, it is important that a bentonite clay rather than a kaolinite, beidellite, or other clay species be employed if impermeable, adherent, yet removable masks are to be obtained.

The finely-divided refractory metal oxide release agents may consist of simple metal oxides such as silica, titania, iron oxide, tin oxide, or calcium oxide, metal oxide products of fusion which provide the required degree of refractoriness such as 96% silica glasses, or metal oxide mixtures, compounds, or combinations such as alundum cement, a mixture typically composed of 90 parts alumina, 5 parts silica and 5 parts lime by weight. By refractory metal oxide agent is meant an agent having a melting point, solidus temperature, or softening point in excess of the highest firing temperature to be encountered by the masking composition. Thus, these metal oxide agents normally have fusing temperatures in excess of 700°C., preferably in excess of 1000°C. By finely-divided metal oxide agent is meant a particulate agent wherein the particle sizes do not exceed about 100 mesh United States Standard Sieve.

Among the ceramic materials which may be usefully masked with our compositions are vitreous ceramics (glasses) and semicrystalline ceramics commonly referred to as glass-ceramics. Both vitreous and semicrystalline ceramics typically have non-porous surfaces which permit ready removal of the masking composition after firing. Hence, very mild removal methods which do not affect the quality of the functional ceramic coating on unmasked surface portions of the ceramic may be utilized to remove these masks. Crystalline ceramic articles having increasing amounts of surface porosity present increasingly difficult removal problems, but the ready removability of our masking compositions permits their use even on some porous ceramic surfaces where masking coatings have not previously been employed.

A convenient method of applying the masking compositions of the inventions comprises mixing a selected composition with a volatile liquid vehicle to form a fluid suspension thereof. This suspension may then be applied by spraying, brushing, dipping, rolling or other conventional means to form a coating and the volatile vehicle may then be driven off by heating the coated ceramic surface to a temperature above the boiling point of the vehicle. A particularly preferred method comprises applying the masking composition in the form of a slip or slurry by spraying onto the ceramic surface.

Removal of the masking composition after the application of the functional decorative, conductive, reflective or protective coating to the ceramic surface is extremely simple, being readily accomplished by water rinsing with occasional hand rubbing even when the masking composition has been subjected to firing temperatures approaching 700°C.

DETAILED DESCRIPTION

The masking compositions of the present invention are particularly useful where the process of applying the functional coating requires spray-coating a heated ceramic surface, and where the edge thickness of the coating is important to its function. An example of such a process is the application of an electroconductive tin oxide coating to a glass or glass-ceramic surface by heating the surface to a high temperature and spraying the hot surface with a solution of a tin compound which decomposes on contact with the surface to yield a tin oxide coating. Normally, glass or glass-ceramic surface temperatures in the range of about 500°–700°C. are employed in this process, and the mask must be in position on the ceramic surface at the time the tin-containing solution is applied. Edge thickness variations in the resulting tin oxide films are to be avoided because such variations produce altered electrical resistance properties at the coating edge; hence, bulky mechanical masks may not be used.

Our masking compositions may usefully be employed in the above-described tin-oxide coating process by applying to selected portions of the glass or glass-ceramic surface to be masked one of the masking compositions above described, preferably by spray application of the composition to the glass or glass-ceramic surface in the form of a flowable slip or slurry, heating the glass or glass-ceramic surface to a temperature in the range of about 500°–700°C. (suitable for decomposing a selected tin compound), spraying the heated surface with a solution of the selected tin compound to achieve the desired degree of tin oxide deposition, cooling the coated surface, and removing the masking composition by the application of water. The resulting tin oxide coatings are of uniform thickness and provide desirable electrical behavior.

Masking compositions which are particularly preferred for masking heated surfaces against sprayed salt solutions consist essentially of about 40–60% by weight of bentonite clay and 40–60% by weight of a finely-divided refractory metal oxide release agent selected from the group consisting of $SiO_2$, CaO and alundum cement, with alundum cement preferably comprising 40–50% of the composition and silica and/or lime comprising 0–10% thereof.

For the preparation of fluid suspensions of the disclosed masking compositions to be applied to ceramic surfaces by spraying or similar means, any water-containing liquid vehicle which may be removed from the composition by volatilization without decomposition may be employed. Suitable vehicles include but are not limited to water and mixtures of water with liquids which are miscible with water, including, for example, the lower alkanols, e.g. alkanols of 1–4 carbon atoms such as methanol, ethanol, or isopropyl alcohol. The nature of the liquid vehicle can affect the removability of the masking composition, however, and for best removability we particularly prefer to employ a vehicle consisting essentially of a mixture of water and methanol which comprises about 20–50% methanol by volume. Masking compositions comprising bentonite clay, alundum cement and, optionally, silica and/or lime are rendered particularly readily removable when slurried with these water-methanol mixtures and applied to ceramic surfaces by conventional spray techniques.

We have found that the adherence and green strength of masking compositions applied to ceramic surfaces with an incorporated water-containing vehicle are improved by heating at temperatures in excess of about 100°C. to remove most of the vehicle component prior to use.

The invention may be further understood by reference to the following example.

EXAMPLE

Two glass-ceramic dishes to be provided with electrically-conductive tin oxide coatings on their base portions only are selected for treatment. The dishes are composed of a lithium aluminosilicate glass-ceramic, material, being semicrystalline in nature but having surfaces essentially free of porosity. A masking composition in the form of a slurry is prepared by adding 40 grams of a bentonite clay, 30 grams of a finely-divided alundum cement metal oxide release agent, and 10 grams of a CaO metal oxide release agent to 200 milliliters of a methanol-water vehicle consisting of 50% methanol and 50% water by volume. The alundum cement had a maximum particle size of about 100 mesh and the CaO also had a maximum particle size of about 100 mesh. The resulting slurry is flowable and has a viscosity suitable for spraying according to conventional methods.

The slurried masking composition prepared as described is applied at room temperature by spraying to the edge portions of one of the glass-ceramic dishes selected for treatment to provide a mask thereon. The edge portions of the other glass-ceramic dish are masked by spraying with a sprayable slurry consisting only of bentonite and water, the thicknesses of the masking layers on each of the two dishes being approximately equivalent.

Following the application of masking layers as described, the two dishes are heated to approximately 600°C. in a kiln, removed, and sprayed while hot with a solution of tin chloride. Upon contact with the heated dishes, the solution is volatilized and the tin chloride is converted by pyrolysis to tin oxide ($SnO_2$).

After coating, the tin-oxide-coated dishes are cooled to room temperature and attempts are made to remove the masking compositions. The mask which is composed of bentonite alone is very difficult to remove, requiring the use of an abrasive detergent composition and vigorous scrubbing to obtain complete removal. The complete avoidance of damage to areas of the tin-oxide coating adjacent to the mask is impossible, and some scratching of the ceramic surface is incurred.

In contrast, the masking composition according to the invention, being composed of bentonite plus the alundum cement-lime release agent, is found to be rather friable upon cooling, and most of the mask can be removed by vigorous spraying with water. Only light brushing or hand rubbing with additional water is required to remove the remainder. The edges of the tin oxide coating adjacent the masked areas are sharp and well-defined, being equivalent in thickness to the remainder of the coating and undamaged by the mask removal process.

While the above example is illustrative of the best mode presently known for carrying out the present invention, it is apparent from the foregoing description that a wide variety of masking compositions employing different release agents and proportions thereof may be prepared within the scope of the present invention. The Table below gives some additional examples of masking compositions, given in parts by weight, which may be usefully employed on glass and glass-ceramic surfaces according to the invention.

TABLE

| | | |
|---|---|---|
| 1. | 25 parts bentonite, | |
| | 5 parts TiO$_2$ | |
| 2. | 25 parts bentonite, | |
| | 5 parts pulverized Corning Code 7930 glass* | |
| 3. | 25 parts bentonite, | |
| | 5 parts SnO$_2$ | |
| 4. | 25 parts bentonite, | |
| | 5 parts ZrO$_2$ | |
| 5. | 25 parts bentonite, | |
| | 5 parts ZnO$_2$ | |
| 6. | 25 parts bentonite, | |
| | 5 parts Al$_2$O$_3$ | |
| 7. | 25 parts bentonite, | |
| | 25 parts TiO$_2$ | |
| 8. | 25 parts bentonite, | |
| | 15 parts Fe$_2$O$_3$ | |
| 9. | 25 parts bentonite, | |
| | 5 parts SiO$_2$ (−400 mesh) | |
| 10. | 25 parts bentonite, | |
| | 25 parts alundum cement | |
| 11. | 25 parts bentonite, | |
| | 25 parts alundum cement, | |
| | 2 parts SiO$_2$ | |
| 12. | 15 parts bentonite, | |
| | 15 parts alundum cement, | |
| | 5 parts CaO | |

*a 96% silica glass having a softening point of about 1500°C.

All of the above masking compositions are readily removable from non-porous ceramic surfaces when applied in the form of flowable slurries by spraying. Water and water-alcohol mixtures are suitable vehicles for preparing such slurries, which typically comprise 65–90% liquid vehicle and 10–35% solids by weight.

Attempts to substitute kaolinitic clays in masking compositions similar to those above described produced masking compositions which did not adhere strongly enough to the ceramic substrate to resist cracking and flaking, particularly when subjected in a heated condition to liquid sprays. It was therefore concluded that kaolin and other clays do not comprise a useful substitute for bentonite in the masking compositions of the present invention.

We claim:

1. A method of masking a ceramic surface against sprayed coating compositions which comprises the steps of:

applying to selected portions of said surface to be masked a fluid suspension comprising a heat-resistant masking composition and a volatile liquid vehicle, said masking composition consisting essentially, in weight percent, of about 40–90% of a bentonite clay and 10–60% by weight of a finely-divided refractory metal oxide release agent, to provide a coating of said suspension on said surface; and drying the coating at a temperature in excess of about 100°C. to remove said volatile liquid vehicle therefrom.

2. A method according to claim 1 wherein the finely-divided refractory metal oxide release agent is selected from the group consisting of silica, titania, iron oxide, tin oxide, calcium oxide, 96% silica glass and alundum cement.

3. A method according to claim 2 wherein the masking composition is applied to the ceramic surface in the form of a flowable slurry consisting essentially of the masking composition and a water-containing vehicle selected from the group consisting of water and water-lower alkanol mixtures by spraying the slurry onto the ceramic surface.

4. A method according to claim 3 wherein the water-containing vehicle consists essentially of a water-methanol mixture comprising about 20–50% methanol by volume.

5. A method according to claim 4 wherein the masking composition consists essentially, in weight percent, of about 40–60% of a bentonite clay and 40–60% of a finely-divided refractory metal oxide release agent selected from the group consisting of alundum cement, silica and lime.

6. A method according to claim 4 wherein the masking composition consists essentially, in weight percent, of about 40–60% of a bentonite clay, 40–50% of alundum cement, and 0–10% of an oxide selected from the group consisting of CaO and SiO$_2$.

7. A method of masking heated ceramic surfaces against tin oxide deposition induced by contact between said surfaces and solutions containing thermally-decomposable tin compounds which comprises applying to selected portions of said surfaces to be masked a heat-resistant masking composition consisting essentially, in weight percent, of about 40–90% of a bentonite clay and 10–60% by weight of a finely-divided refractory metal oxide release agent to provide a coating of said composition on said surfaces.

* * * * *